United States Patent [19]

Chang et al.

[11] Patent Number: 5,228,856
[45] Date of Patent: Jul. 20, 1993

[54] OPTICS APPROACH TO LOW SIDE COMPLIANCE SIMULATION

[75] Inventors: David B. Chang, Tustin; I-Fu Shih, Los Alamitos, both of Calif.

[73] Assignee: Hughes Aircraft Company, Los Angeles, Calif.

[21] Appl. No.: 653,530

[22] Filed: Feb. 11, 1991

[51] Int. Cl.⁵ .............................................. G09B 9/08
[52] U.S. Cl. ........................................ 434/44; 434/38; 434/69; 358/104; 359/847; 353/37
[58] Field of Search .................. 434/29, 30, 38, 43, 434/44, 69; 358/104, 93, 125; 353/8, 11, 44, 75, 68, 66, 98, 99, 81, 31, 32, 33, 37; 356/241, 445; 250/223 B, 224, 572; 340/702; 359/847, 849

[56] References Cited

U.S. PATENT DOCUMENTS

| | | | |
|---|---|---|---|
| 3,131,487 | 5/1964 | Lyon et al. | 434/38 |
| 3,537,096 | 10/1970 | Hatfield | 358/93 X |
| 3,632,184 | 1/1972 | King | 359/847 X |
| 3,652,157 | 3/1972 | Blackert et al. | 355/45 X |
| 4,114,997 | 9/1978 | Lunetta | 353/11 |
| 4,251,929 | 2/1981 | Precicaud | 434/44 |
| 4,395,234 | 7/1983 | Shenker | 434/43 X |

OTHER PUBLICATIONS

"Optical Scanning Probe Technology" by Martin Shenker, Simulator & Simulation, vol. 59, 1975, pp. 1–9.

Primary Examiner—Richard J. Apley
Assistant Examiner—Joe H. Cheng
Attorney, Agent, or Firm—Michael W. Sales; Wanda K. Denson-Low

[57] ABSTRACT

A low cost visual simulation system (100) for training simulators is disclosed. Aerial photo transparencies are used directly as image sources without creating a digital data base. The approximately correct image perspective is generated optically by a deformable mirror (114) and a zoom lens and rotation prism assembly (106). Stereo image photo pairs (120) need to be analyzed only at a relatively small number of points; thus, the computational burden is greatly reduced.

10 Claims, 2 Drawing Sheets

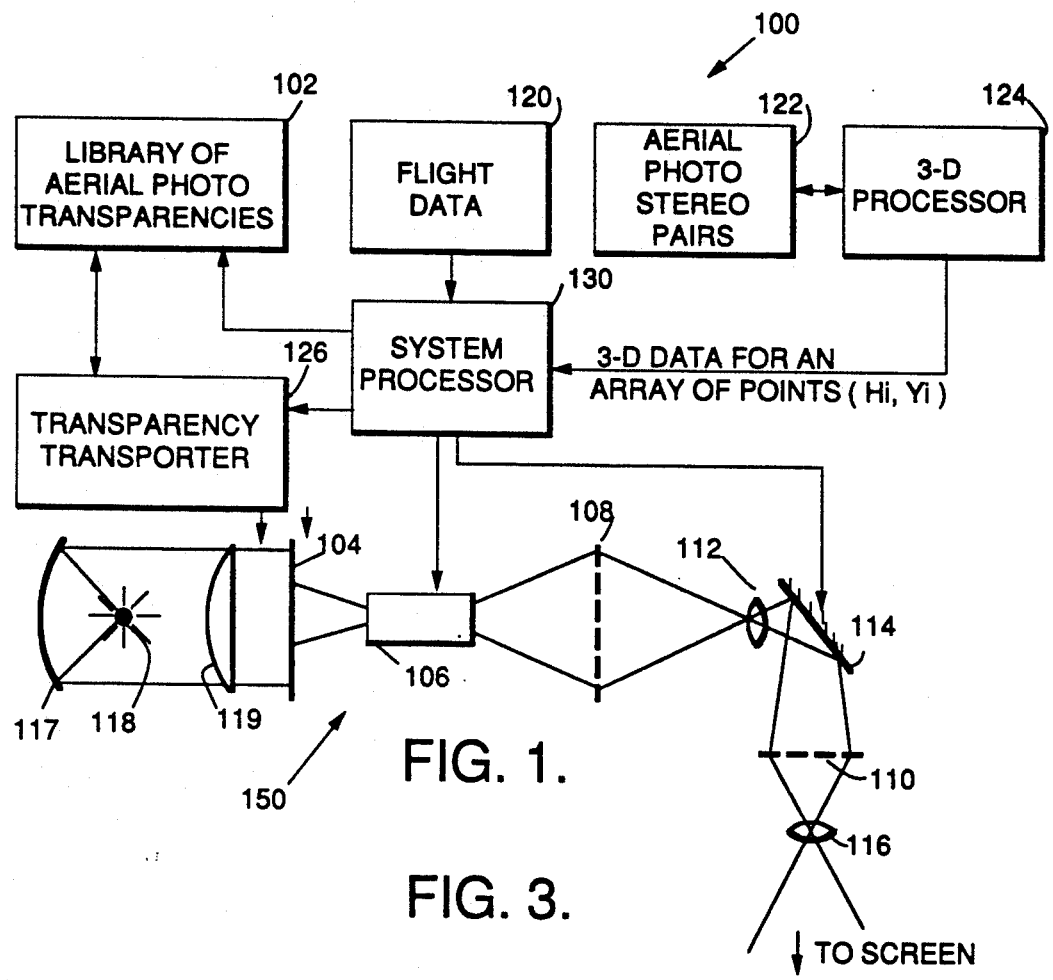
FIG. 1.
FIG. 3.
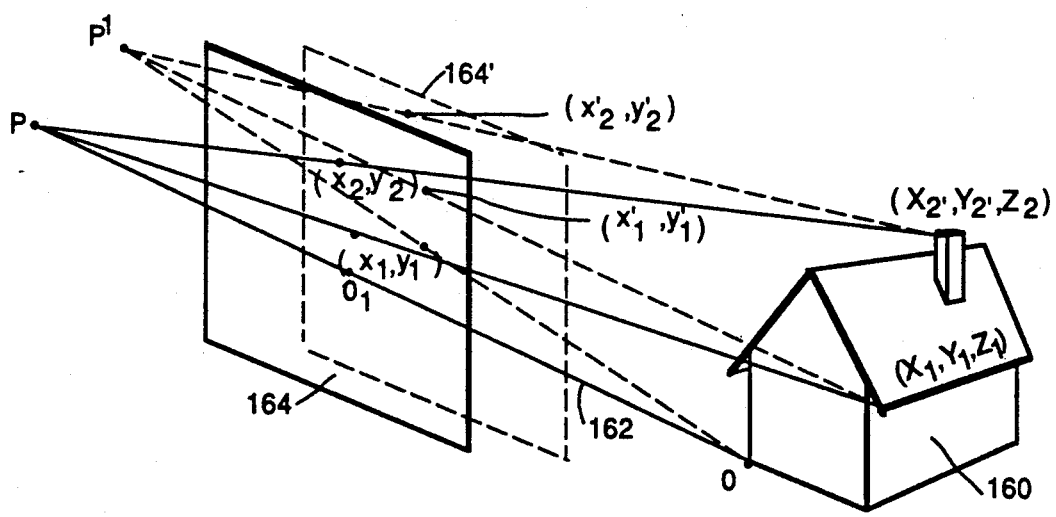

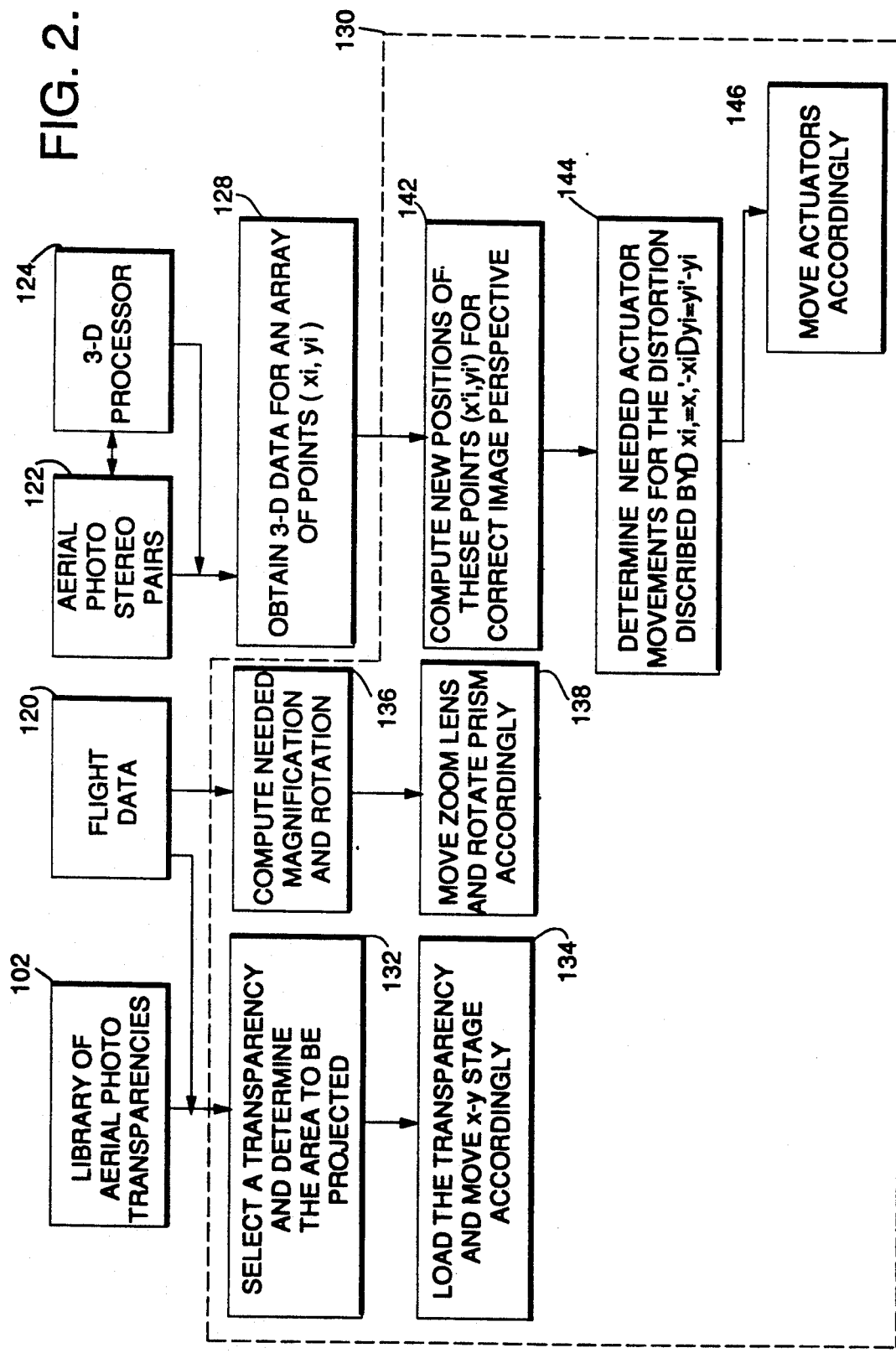

OPTICS APPROACH TO LOW SIDE COMPLIANCE SIMULATION

BACKGROUND OF THE INVENTION

The present invention relates to low cost visual training simulators.

There is a need for visual image simulation, e.g., for use as aircraft and other vehicle training simulators. Digital image generation techniques, while capable of producing high quality simulated images, requires expensive, time-consuming processes to generate high resolution digital data bases. The high cost of hardware and software needed to provide visual simulation with high resolution has limited its application to a relatively small market sector.

There is therefore a need to provide a low cost visual simulation system.

SUMMARY OF THE INVENTION

According to this invention, aerial photo transparencies are used directly as image sources without creating a digital data base. The approximately correct image perspective is generated optically by a deformable mirror, a zoom lens, and a rotation prism. The original stereo aerial photos need to be analyzed only at a relatively small number of points; thus, the computation burden is greatly reduced.

A visual simulation system in accordance with the present invention includes one or more photographic transparencies, covering the area to be visually simulated. The system further includes an optical projection section, comprising light source, a transparency holder, a zoom lens, and a rotation prism for presenting a properly scaled and oriented image at a first image plane of the system, and a deformable mirror arranged to present an image with proper image perspective at a second image plane of the projection system section. The simulation system further includes a controller section which comprises means for adjusting the zoom lens to provide the desired scale of the projected image, means for adjusting the rotation prism to provide the desired orientation of the projected image, and means for deforming the mirror so as to provide the desired perspective of the projected image.

In one application, the simulation system is employed in a flight simulator, and the zoom lens, the prism and the mirror are adjusted in accordance with the simulated flight data.

The purpose of the present invention is to provide a significantly lower cost visual simulation with lower performance that is still acceptable in many applications. Successful implementation of this invention is needed in a large market in which more sophisticated visual simulation is not economically sound.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 is a simplified schematic block diagram of a visual simulation system in accordance with the invention.

FIG. 2 is a block diagram illustrative of the functions performed by the processor of the simulation system of FIG. 1.

FIG. 3 is a schematic depiction of the transformation of a three dimensional object into two dimensional information.

DETAILED DESCRIPTION OF THE PREFERRED EMBODIMENT

A preferred embodiment of the invention, a visual system 100 which provides, in this example, an out-of-the-cockpit scene for a training simulator, is shown in FIGS. 1 and 2. The source of images is a set of stereo aerial photos. A stereo pair of aerial photos is generated by taking two snapshots of an area from two slightly different positions, with a camera mounted on an airplane. Because of the slightly different perspective, three-dimensional ("3-D") information of the area can be deduced from the stereo pair of photos.

Instead of creating a 3-D digital data base by digitizing and analyzing whole aerial photos in the conventional manner, a library 102 of transparencies of aerial photos are used in the projection system 100. The proper image scale, orientation, and distortion are generated by a dynamically deformable mirror, together with a zoom lens and a rotation prism.

A set of aerial photo transparencies covering the whole game area is stored in a library 102. For example, one of the two photos of each stereo photo pair can be chosen to form a set of photo transparencies. The game area is the geographic area within which all possible manipulation in the simulation would occur, e.g., landing or target bombardment. The location from which each photograph is taken and the orientation of the photographing camera is known. Similar data is known with respect to each photo of the aerial photo stereo pairs 122. This location and orientation information is known to the processor 130 comprising the system.

Flight data generator 120 generates simulated aircraft position, heading, altitude and speed data used to control the simulation system elements. The generator 120 may be controlled, in a particular application, by the actions of the trainee, e.g., by manipulating the simulator flight controls.

The system 100 further comprises a library 122 of aerial photo stereo pairs, which have been analyzed by a three-dimensional processor 124 off-line, as described more fully below, to obtain 3-D data from an array of points or pixels on the respective stereo photo pairs.

The simulation system 100 further includes a processor 130 and an optical projection system 150.

The projection system 150 comprises a reflector 117 for directing light from a light source 118 through a collimating lens 119 to the transparency holder 104. The projection system 150 further includes the zoom lens and rotation prism assembly 106 which forms an image at the first intermediate image plane 108, a relay lens 112, and a dynamically deformable mirror 114, which forms an image at a second intermediate image plane 110. A projection lens 116 directs the system output image to a projection screen for viewing.

The functions performed by the processor 130 are illustrated in FIG. 2. The processor 130 acts in response to changes in the flight data (function 120) to adjust the projected image in dependence on the new flight data. During the course of training using the simulator, one transparency is selected out (function 132) in dependence on the flight data, and loaded into the projection system at a transparency holder 104 and positioned in X and Y in relation to the center projector axis (function 134) to project the appropriate image portion of the transparency. Thus, the transparency holder 104 comprises a positioning means for positioning the transparency in X and Y. An automated transport apparatus 126 under control of the system processor 130 is used to pick the selected transparency and load it into the transparency holder.

At function 136, the needed magnification and rotation are computed according to the flight data 120 and in dependence on the known photograph location and orientation as described above, and the zoom lens and prism are moved accordingly (function 136). The zoom lens and rotation prism assembly 106 is used to produce, at the first intermediate image plane 108, a properly scaled and oriented image, according to the flight data 120, i.e., the altitude, speed, position, and direction at which flight is being simulated. Due to the possible magnification, only a small portion of the image recorded in the transparency may actually be projected, depending on the flight data; thus, the transparency holder includes a positioning mechanism for positioning the desired portion of the transparency image. This image is then relayed to the second intermediate image plane 110 by a relay lens 112 through a deformable mirror 114 which produces correct image perspective at the second image plane 110. Finally, the image at the second intermediate image plane 110 is projected to the screen through a projection lens 116.

The correct image perspective is generated in the following procedure. The stereo aerial photo pairs 122 are analyzed off-line with a 3-D processor 124 to obtain 3-D data for an array of points $(x_i, y_i)$ on the two-dimensional photo image (function 128). This function is performed prior to the operation of the simulator, and the resulting 3-D data for each stereo photo pair is stored in a memory. The 3-D data is the collection of a set of coordinates $(X_i, Y_i, Z_i)$, for $i = 1, 2 \ldots n$, where $(X_i, Y_i)$ represents a geographic point and $Z_i$ represents the height this point. 3-D processors are known in the art which are suitable for this purpose. See, C. Slava (editor), "Manuel of Photogrammetry—4th Edition," Chapters II, X and XII, American Society of Photogrammetry, 1980. One such processor is a hardware device that can derive the 3-D data directly from the stereo image. Another type of processor suitable for the purpose is implemented in software. Each image of the stereo pair is digitized, and the software algorithm determines the amount of shift between the respective images of the pair and calculates the height at each point of interest.

According to the flight data, a new position $(x'_i, y'_i)$ of these points $(x_i, y_i)$ is computed in real-time (function 142) for correct image perspective. The computation is a geometric one, and employs the known data regarding the position and orientation from which the transparency photograph was taken, the known data regarding the present simulated flight position and orientation, and the 3-D data $(X_i, Y_i, Z_i)$ determined by the particular stereo photo pair from which the particular transparency photo was taken.

The computation of the new positions for the points $(x_i, y_i)$ is illustrated in further detail in FIG. 3. When a three-dimensional object is viewed by an observer or a camera, the three-dimensional information is mapped into two-dimensional information. The mathematical transformation is to project the three-dimensional object onto a plane perpendicular to the line of sight, as shown in FIG. 3. Here, the observer is at point P, and the three-dimensional object 160, in this example a building, is situated so that its corner at 3-D origin point "0" is on the observer's line of sight 162. This same 3-D point is mapped into the origin $O_1$ of the plane 164 which is perpendicular to the line of sight 162. The 3-D points $(X_1, Y_1, Z_1)$ and $(X_2, Y_2, Z_2)$ are mapped into corresponding 2-D points $(x_1, y_1)$ and $(x_2, y_2)$ on the plane 164. When the observer moves to another point, say P', the same mapping calculation leads to $0_1'$, $(x_1', y_1')$ and $(x_2', y_2')$ on the plane now shown as phantom plane 164', which moves with the observer, remaining perpendicular to his line of sight. The required shifts of these two points are $\Delta x_i = x_1' - x_1$, and $\Delta y_1 = y_1' - y_1$.

The required distortion described by $\Delta x_i = x_1' - x_1$ and $\Delta y_1 = y_1' - y_1$ is then generated by the deformable mirror 114. The amount of actuator movements to achieve a desired distortion can be determined (function 144) according to the prescription disclosed in U.S. Pat. No. 4,773,748, the entire disclosure of which is incorporated herein by reference. See in particular equations 1 and 10 and the discussion regarding these equations in U.S. Pat. No. 4,773,748.

At function 146, the mirror actuators are moved accordingly to obtain the new point positions. In a preferred implementation, piezoelectric mirror actuators are employed to deform the mirror.

According to this invention, the 3-D data are obtained only for an array of a relatively small number of points, say $100 \times 100$. The number of points analyzed is far smaller than the total pixel number and can be chosen simply by equally dividing each side into 100 small divisions. This means a significant reduction of computation burden. Thus, it is possible to build a high resolution real-time system at low cost.

The main drawback with this approach is that only approximately correct perspective can be generated. During the course of training, if the flight direction is different from the direction in which the library photo was taken, the library photo cannot faithfully simulate the scene. For example, if the flight direction is opposite to the direction for the library photo, the opposite side of a building should have been seen.

The faithfulness of the image perspective can be improved by multiplying the transparency set. For example, for each area two or more photos can be taken from two or more different approaching directions. The one closest to the training flight path is chosen to be loaded into the projection system. When more photos taken from different directions are used for each area, the fidelity of simulation can be improved.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A visual simulation system, comprising:
   a library of photographic transparencies, said transparencies covering the area to be visually simulated; and
   an optical projector system section, comprising:
     a zoom lens;
     a rotation prism;

means for projecting at least a portion of the image on a selected one of said transparencies through said lens and said prism to present an image of proper scale and orientation at a first image plane of the projector system; and a deformable mirror arranged to present an image with proper image perspective at a second image plane of the projector system; and a controller section comprising:

means for adjusting the zoom lens to provide the desired scale of the projected image;

means for adjusting the rotation prism to provide the desired orientation of the projected image; and means for deforming the mirror so as to provide the desired perspective of the projected image.

2. The system of claim 1 wherein said projecting means comprises means for projecting only a selected part of said transparency image through said lens and said 3. The system of claim wherein said system is capable of simulating a dynamically changing scene seen by a moving object.

4. The system of claim 3 wherein said means for adjusting said zoom lens, means for adjusting said prism and said means for deforming said mirror are dynamically controlled in dependence on the particular location of said object.

5. The system of claim 4 further characterized in that said system is employed in a flight simulator to project simulated images in accordance with simulated flight data.

6. The system of claim 5 wherein said controller further comprising a system processor for controlling said zoom lens adjusting means, said rotation prism adjusting means and said mirror deforming means in dependence on said simulated flight data.

7. The system of claim 6 further comprising means controlled by said controller for selecting a particular one of said photographic transparencies in dependence on said flight data.

8. The system of claim 7 wherein said controller further comprises means for storing three-dimensional (3-D) data for a selected limited point set regarding said selected photographic transparency, said 3-D data determined from a stereo photograph pair of the image carried by said transparency, and said 3-D data is employed by said processor to determine the adjustments needed to adjust said deformable mirror in dependence on said flight data.

9. A visual simulation system which can be manipulated to generate dynamically changeable scenes of a geographic area, characterized by:

a library of aerial image transparencies which collectively cover said geographic area;

for each of said transparencies, a set of three-dimensional (3-D) data for a limited number of points over said transparency image;

means for generating simulated position and motion data for controlling the manipulation of said scenes of said geographic area;

an optical projector means, comprising a zoom lens, a rotation prism, means for projecting at least a portion of the image on a selected one of said transparencies through said lens and said prism to present an image of proper scale and orientation at a first image plane of said projector means, and a dynamically deformable mirror arranged to present an image with proper image perspective at a second image plane of said projector means; and a processor and controller means, comprising means responsive to said simulated position and motion data and to said 3-D data for adjusting said zoom lens to provide the proper scale of the projected image, means for adjusting the rotation prism to provide the proper orientation of the projected image, and means for deforming the mirror so as to provide the proper perspective of the projected image.

10. The system of claim 9 further characterized in that said system is employed in a flight simulator to project simulated images in accordance with simulated flight data comprising said simulated position and motion data.

* * * * *